United States Patent [19]

Nishizawa et al.

[11] Patent Number: 5,327,173
[45] Date of Patent: Jul. 5, 1994

[54] MOVING IMAGE CODING APPARATUS AND MOVING IMAGE DECODING APPARATUS

[75] Inventors: Yoshitsugu Nishizawa; Yuji Takenaka, both of Kawasaki; Takahiro Hosokawa, Yokohama; Yuji Mori; Hideki Miyasaka, both of Kawasaki, all of Japan

[73] Assignee: Fujitsu Limited, Kawasaki, Japan

[21] Appl. No.: 655,359

[22] PCT Filed: Jun. 19, 1990

[86] PCT No.: PCT/JP90/00799
§ 371 Date: Feb. 19, 1991
§ 102(e) Date: Feb. 19, 1991

[87] PCT Pub. No.: WO90/16130
PCT Pub. Date: Dec. 27, 1990

[30] Foreign Application Priority Data

Jun. 19, 1989 [JP] Japan ................................ 1-156573
Jun. 20, 1989 [JP] Japan ................................ 1-157939

[51] Int. Cl.$^5$ .......................... H04N 7/12; H04N 1/41
[52] U.S. Cl. .................................. 348/412; 348/409
[58] Field of Search ............... 358/133, 135, 136, 105; 382/50

[56] References Cited

U.S. PATENT DOCUMENTS 4,677,479  6/1987  Hatori .................... 358/135

FOREIGN PATENT DOCUMENTS 54-47513   4/1979  Japan .
58-159084  9/1983  Japan .
60-180388  9/1985  Japan .
61-201570  9/1986  Japan .
63-310294 12/1988  Japan .
64-48579   2/1989  Japan .
1-103387   4/1989  Japan .

Primary Examiner—Tommy Chin
Attorney, Agent, or Firm—Staas & Halsey

[57] ABSTRACT

A moving image coding apparatus comprises: an intraframe coding circuit for carrying out band compression of moving image data by intraframe coding; an interframe coding circuit for carrying out band compression of moving image data by interframe coding; a block division circuit for dividing data in each frame into a plurality of blocks each of which includes a predetermined number of pixels; and a coding switch circuit for switching a coding operation which is carried out in the coder, so that coding is carried out by the intraframe coding circuit for moving image data of a predetermined portion of pixels in each of the plurality of blocks, and coding is carried out by the interframe coding circuit for moving image data of a remaining portion of pixels in each of the plurality of blocks. A moving image decoding apparatus comprises: an interframe decoding circuit for decoding moving image data which is band compressed by interframe coding; an intraframe decoding circuit for decoding moving image data which is band compressed by intraframe coding; and a decoding switch circuit for switching a decoding operation which is carried out in the decoder, so that decoding is carried out by the intraframe decoding circuit when moving image data which is band compressed by intraframe coding is input, and decoding is carried out by the interframe decoding circuit when moving image data which is band compressed by interframe coding is input.

16 Claims, 7 Drawing Sheets

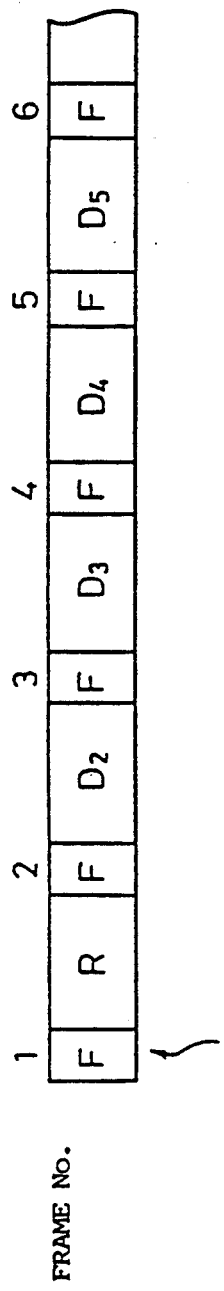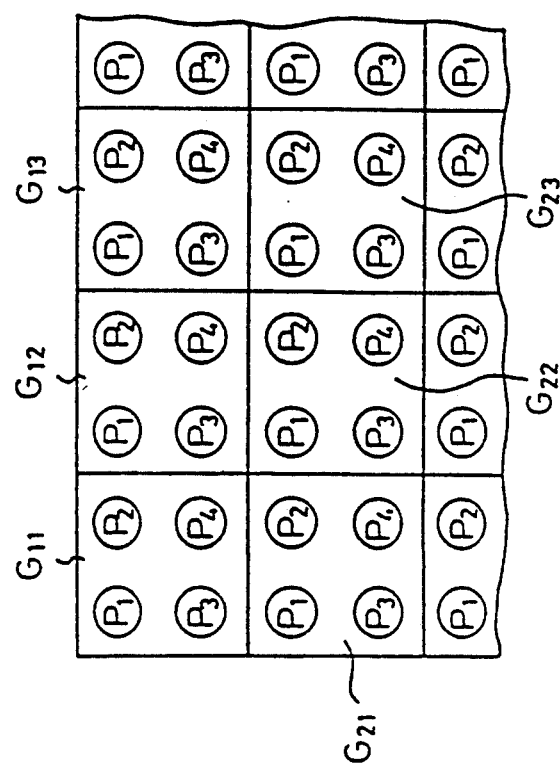

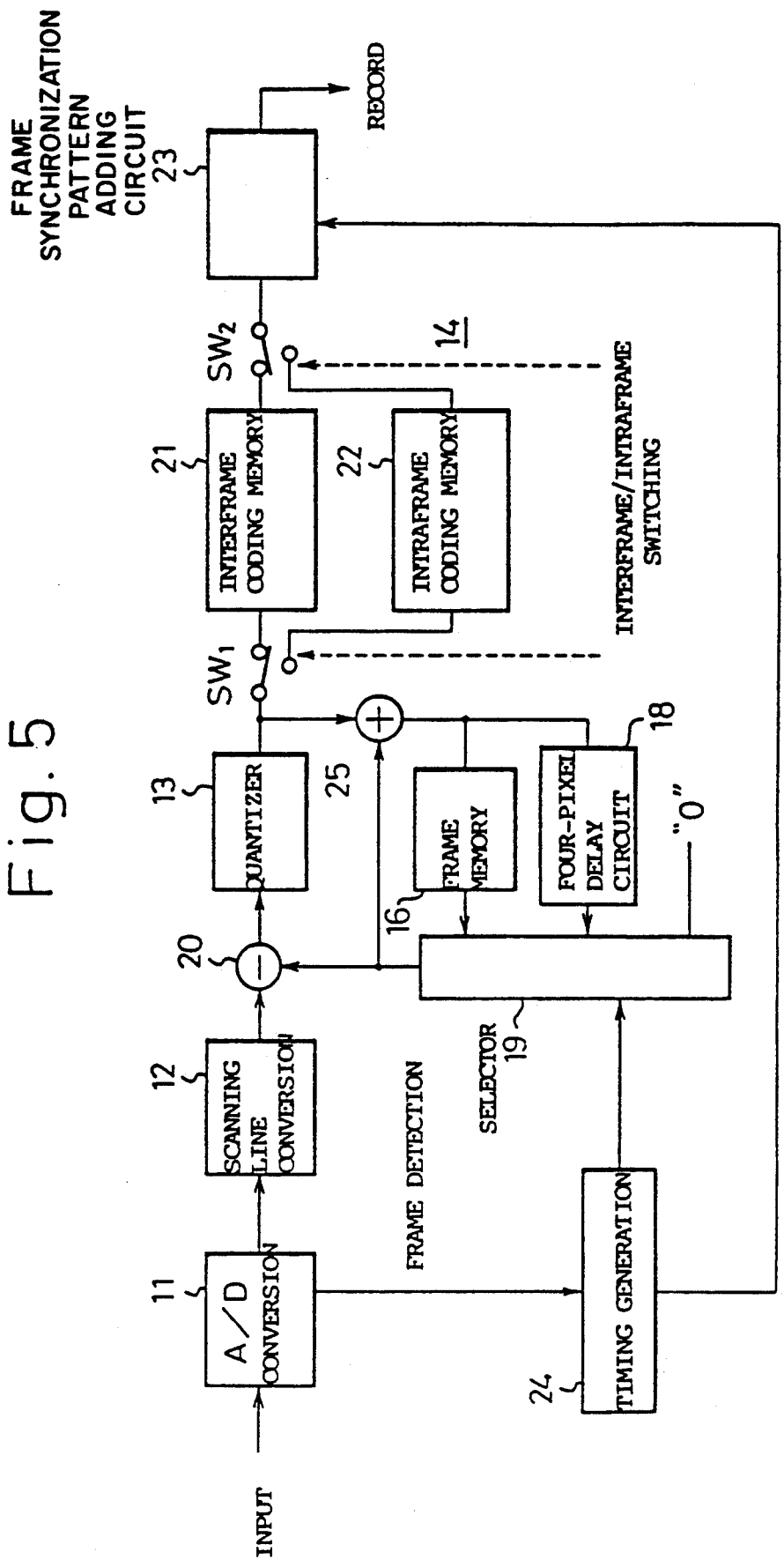

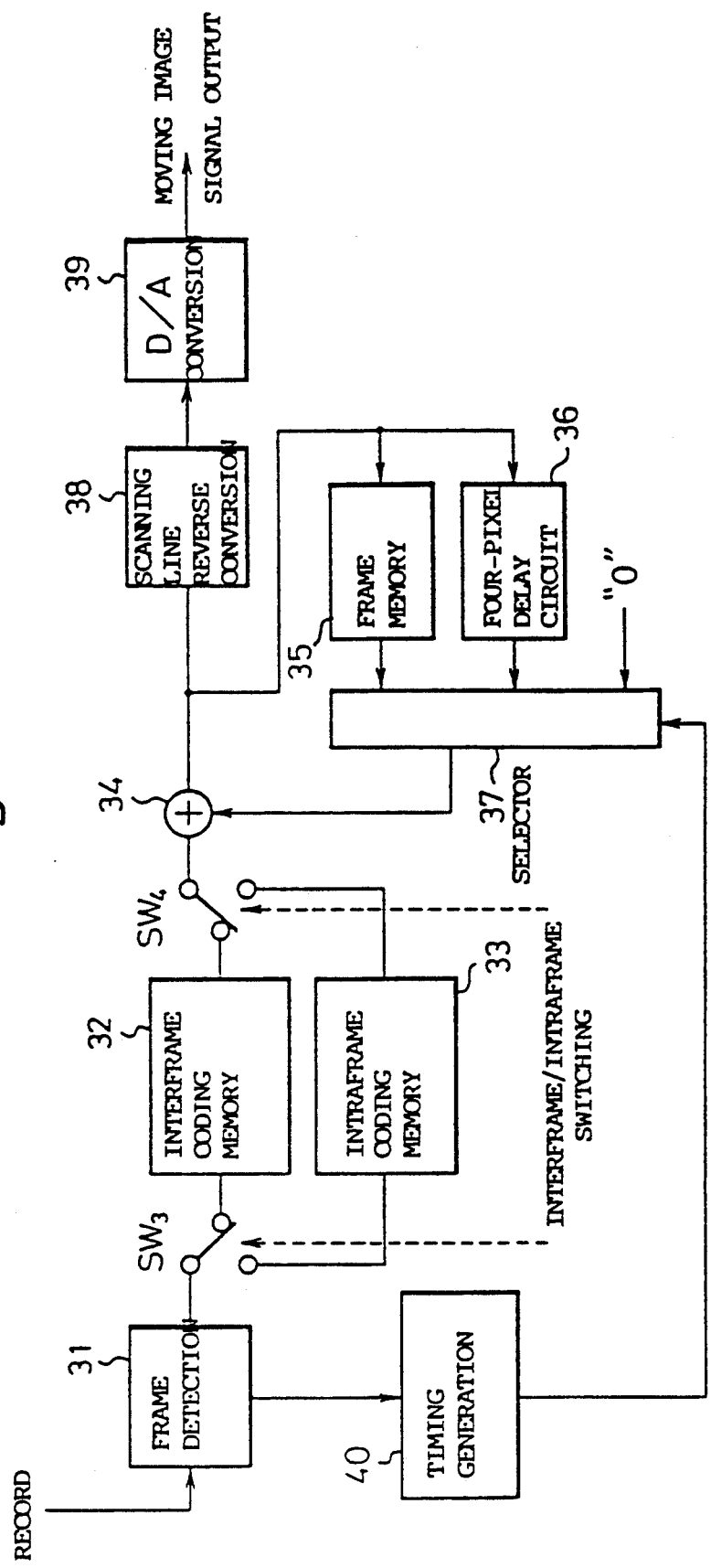

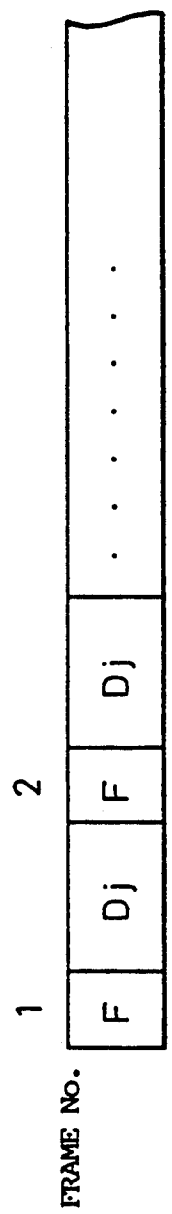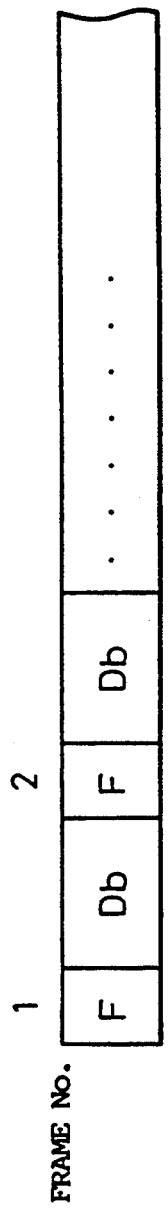

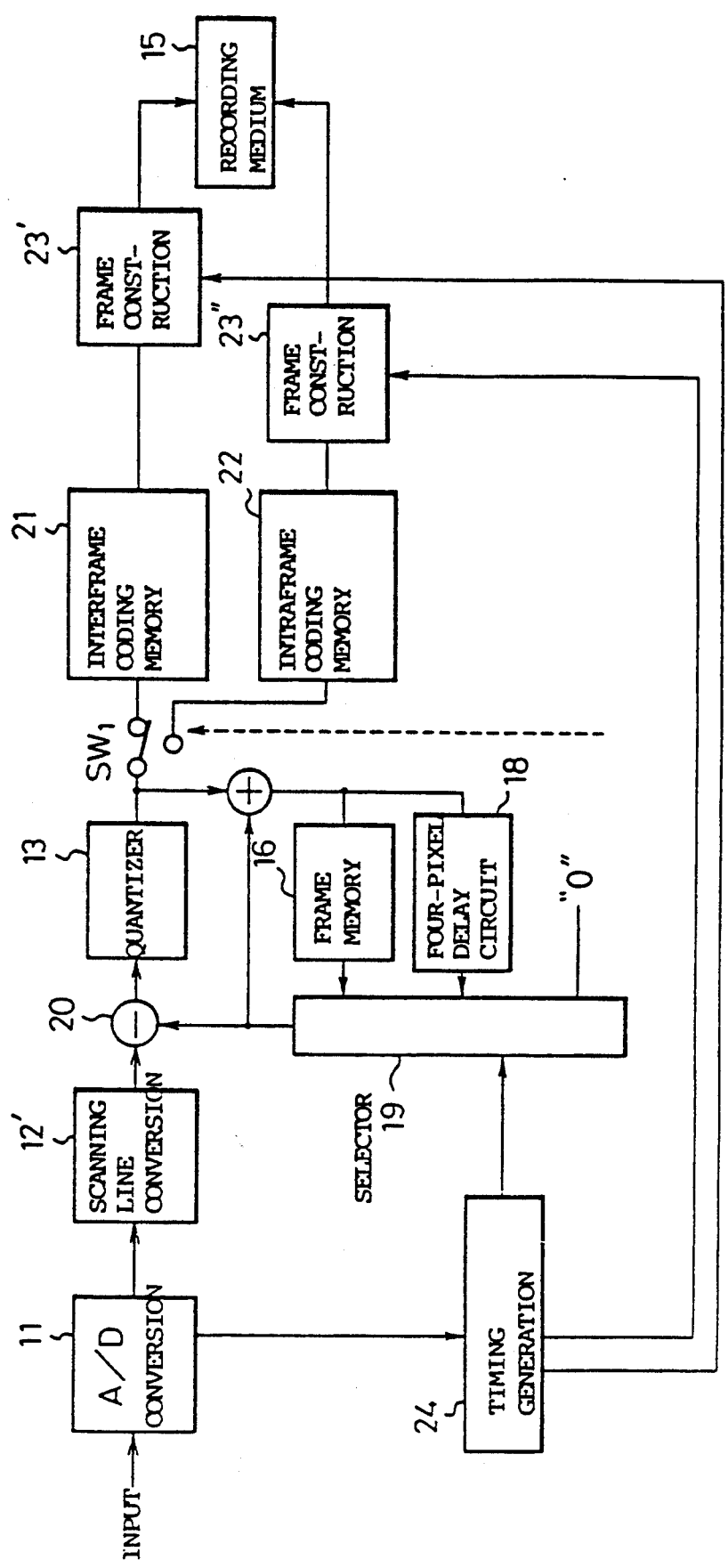

MOVING IMAGE CODING APPARATUS AND MOVING IMAGE DECODING APPARATUS

BACKGROUND OF THE INVENTION

1. Technical Field of the Invention

The present invention relates to a moving image coding apparatus, which carries out band compression of moving image data to record the band compressed moving image data, and a moving image decoding apparatus, which decodes band compressed image data to regenerate image data from the band compressed image information.

A moving image data signal such as an output signal of a television camera, may be transmitted in real time, or be recorded once on a recording medium such as a disc device, and the recorded data may be regenerated later to use the moving image data. In the above case, the moving image data may be recorded as is or after being band compressed, in the same way as the moving image data signal may be transmitted as is or after being band compressed. However, there are some requirements for recording moving image data after being band compressed, which are different from the requirements for transmitting moving image data after being band compressed. Therefore, it is generally impossible to apply a conventional band compression technique which has been used in data transmission, to band compression for recording moving image data.

As a recording apparatus for moving image data, a video tape recorder or a film on which moving image data is recorded in an analog form, or a laser disc apparatus in which moving image data is recorded in a digital form, are known. In the above recording apparatuses, conventionally, moving image data is recorded as is. However, since the moving image data signals are wide band signals, there is a limit for recording a large amount of moving image data. Therefore, a technique for effectively recording moving image data by utilizing a method for band compression as used in the conventional apparatuses for transmitting data, is required.

2. Description of the Related Art

FIG. 1 shows a data format in a typical band compression method which is used in a conventional transmission apparatus. In the drawing, F denotes a frame synchronization pattern, R denotes an initial value of data, and $D_2$, $D_3$, ... each denote an interframe difference data. The data R which is a reference value for use in calculation of the difference, is written in the first frame, and difference data $D_i$ (i=2, 3, ...), which is a difference between data before being coded and data in a preceding frame, is written in each of the second frame and the following frames. Therefore, in a receiver side, when the first frame is received, the data R is used as a decoded data $F_1$ of the first frame; when the second frame is received, the received data is added to the preceding data R ($=F_1$) to obtain $F_1+D_2$ as a decoded data $F_2$ of the second frame; when the third frame is received, data $F_2+D_3$ is used as a decoded data $F_3$ of the third frame; and similar operations are carried out for the following frames. Since only difference data is transmitted in the second and following frames to realize band compression, the amount of transmitted data is small. For example, in the case of transmission of moving image data in a video telephone, full data of a picture of a speaker is transmitted as the above data R of the first frame, and then, only difference data from the preceding frame is transmitted for each of the second and following frames until the transmission is completed. If an error occurs, regeneration of images of the frame in which the error occurs, and the following frames, is impossible. Therefore, full data of a whole picture, instead of difference data, is transmitted when an error occurs, or full data, instead of difference data, is included for a different pixel in each frame so that complete data of a picture can be regenerated after at least a predetermined time elapsed from the occurrence of an error.

In the recording of moving image data, a function of making a data base of the moving image data, and random-accessing a requested portion of the data base; and a function of scanning the moving image data in a forward or backward direction, and the like, are necessary. However, when the above-mentioned method of band compression which is used for transmitting data is applied to recording of moving image data, and the data as shown in FIG. 1 is recorded, it is impossible to regenerate an image when starting to read the recorded data from a frame following the first frame, or when skipping frames on the way in the forward scanning operation.

SUMMARY OF THE INVENTION

An object of the present invention is to provide a recording apparatus and regenerating apparatus for moving image data, which carries out band compression of data of a moving image to record the band compressed image data, and which enables regeneration of an image when starting to read the recorded data from a frame following the first frame, or skipping frames on the way in the forward scanning operation. Another object of the present invention is to provide a moving image data coding apparatus and moving image data decoding apparatus, which are used in the above recording apparatus and regenerating apparatus, respectively.

According to a first aspect of the present invention, there is provided a moving image coding apparatus for band compressing moving image data, comprising: an intraframe coding means for carrying out band compression of moving image data by intraframe coding; an interframe coding means for carrying out band compression of moving image data by interframe coding; a block division means for dividing data in each frame into a plurality of blocks each of which includes a predetermined number of pixels; and a coding switch means for switching a coding operation which is carried out in the coder, so that coding is carried out by the intraframe coding means for moving image data of a predetermined portion of pixels in each of the plurality of blocks, and coding is carried out by the interframe coding means for moving image data of a remaining portion of pixels in each of the plurality of blocks.

According to a second aspect of the present invention, there is provided a moving image decoding apparatus for decoding band compressed moving image data, comprising: an intraframe decoding means for decoding moving image data which is band compressed by intraframe coding; an interframe decoding means for decoding moving image data which is band compressed by interframe coding; and a decoding switch means for switching a decoding operation which is carried out in the decoder, so that decoding is carried out by the intraframe decoding means when moving image data which is band compressed by intraframe coding is input, and decoding is carried out by the interframe decoding means when moving image data which is band compressed by interframe coding is input.

BRIEF DESCRIPTION OF DRAWINGS

FIG. 1 shows a data format in a typical band compression method which is used in a conventional transmission apparatus;

FIG. 2 shows a control process in the embodiment of the first aspect of the present invention;

FIG. 5 shows a detail of the construction of FIG. 4;

FIG. 6 shows a construction of a data regenerating apparatus for decoding moving image data which is band compressed and recorded, to regenerate an image;

FIG. 7 shows a data format which is used for recording data which is coded by intraframe coding in another embodiment of the present invention;

FIG. 8 shows a data format which is used for recording data which is coded by interframe coding in another embodiment of the present invention;

FIG. 9 shows a construction of a recording apparatus for moving image data in another embodiment of the present invention.

DESCRIPTION OF THE PREFERRED EMBODIMENTS

FIG. 2 shows a magnified view of a portion of a frame of moving image data in an embodiment of the present invention. As shown in FIG. 2, according to the present invention, each frame containing a plurality of pixels is divided into a plurality of blocks each of which contains a predetermined number of pixels. In the embodiment shown in FIG. 2, each frame is divided into blocks $G_{11}$, $G_{12}$, $G_{13}$, . . ., $G_{21}$, $G_{22}$, $G_{23}$, . . . each comprised of 2×2 pixels, where each block $G_{11}$, $G_{12}$, $G_{13}$, . . ., $G_{21}$, $G_{22}$, $G_{23}$, . . . contains four pixels denoted by $P_1$, $P_2$, $P_3$, and $P_4$.

According to the present invention, data of a portion of the plurality of pixels in each of the above blocks is coded by intraframe difference calculation, and data of the other pixels in the block is coded by interframe difference calculation. For example, in the example of FIG. 2, data of one pixel $P_1$ of the above four pixels $P_1$, $P_2$, $P_3$, and $P_4$ is coded by the intraframe difference calculation, and the other three pixels $P_2$, $P_3$, and $P_4$ in the block are coded by interframe difference calculation.

Further, for example, in the first frame, data of one pixel $P_1$ of the above four pixels is coded by the intraframe difference calculation, and the other three pixels $P_2$, $P_3$, and $P_4$ in the block are coded by interframe difference calculation; in the second frame, data of one pixel $P_2$ of the above four pixels is coded by the intraframe difference calculation, and the other three pixels $P_3$, $P_4$, and $P_1$ in the block are coded by interframe difference calculation; in the third frame, data of one pixel $P_3$ of the above four pixels is coded by the intraframe difference calculation, and the other three pixels $P_4$, $P_1$, and $P_2$ in the block are coded by interframe difference calculation; and in the fourth frame, data of one pixel $P_4$ of the above four pixels is coded by the intraframe difference calculation, and the other three pixels $P_1$, $P_2$, and $P_3$ in the block are coded by interframe difference calculation. Namely, pixel data which is coded by the intraframe difference calculation can be shifted cyclically in each block.

Figure 3:
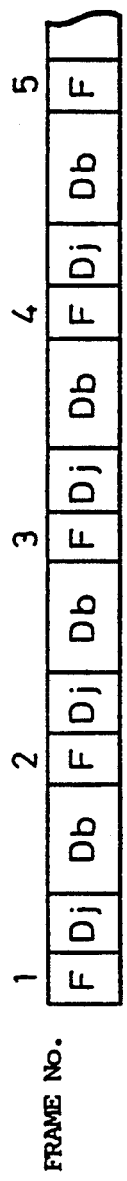
FIG. 3 shows a data format which is used in an embodiment of the present invention.

The data which is coded by the intraframe difference calculation is equal to: real data for the pixel $P_1$ in the block $G_{11}$ (or may be a difference from a predetermined reference value); a difference of data of the real data of the pixel $P_1$ in the block $G_{12}$ from the data of the pixel $P_1$ in the block $G_{11}$, for the pixel $P_1$ in the block $G_{12}$; a difference of data of the real data of the pixel $P_1$ in the block $G_{13}$ from the data of the pixel $P_1$ in the block $G_{12}$, for the pixel $P_1$ in the block $G_{13}$; and so on. The data which is coded by the interframe difference calculation is equal to: real data for the pixel $P_3$ in the block $G_{11}$ (or may be a difference from a predetermined reference value); a difference of data of the real data of the pixel $P_3$ in the block $G_{11}$ in the second frame from the data of the pixel $P_1$ in the block $G_{11}$ in the first frame; a difference of data of the real data of the pixel $P_3$ in the block $G_{12}$ in the second frame from the data of the pixel $P_1$ in the block $G_{12}$ in the first frame; and so on. The coded data as above is recorded on a recording medium in a data format as shown in FIG. 3. In FIG. 3, F denotes a frame synchronization pattern, $D_j$ denotes data of a pixel which is coded by the intraframe difference calculation, and $D_b$ denotes data of a pixel which is coded by the intraframe difference calculation.

When, as explained above, a picture is divided into a plurality of blocks, each block (group) contains a plurality of pixels, and in each block, a portion of the pixels are represented by data by the intraframe difference calculation, and the other portion of the pixels is represented by data by the interframe difference calculation, the regeneration from any frame following the first frame, is possible. Since pixel data which is represented by the intraframe difference calculation, can be regenerated, although pixel data which is represented by the interframe difference calculation, cannot be regenerated, the start of the regeneration from any frame following the first frame, is possible though definition may be degraded.

Generally, it is more effective to carry out difference calculation between frames than to carry out difference calculation in a frame (picture), in band compression of moving image data. For example, when the image is static, all the difference calculation data in the second and the following frames is zero by the difference calculation between frames. Regarding to the above, in each of the blocks $G_{11}$, $G_{12}$, $G_{13}$, . . ., it is better that the number of pixels data of which are coded by the interframe difference calculation, is larger than the number of pixels data of which are coded by the intraframe difference calculation. However, since the larger the number of pixels the data of which are coded by the interframe difference calculation is, the coarser the regenerated image becomes when the regeneration is started from any frame following the first frame, both the definition of the image and the degree of the compression must be considered to appropriately determine a ratio of the number of pixels data of which are coded by the interframe difference calculation, to the number of pixels data of which are coded by the intraframe difference calculation. In addition, the number of the pixels in each block (the size of each block) must also be appropriately determined so that the above appropriate ratio is obtained. Further, each of the above blocks $G_{11}$, $G_{12}$, $G_{13}$, . . ., may be a one-dimensional block comprised of a plurality of pixels in a line, or a two-dimensional block comprised of pixels over two lines.

Figure 4:
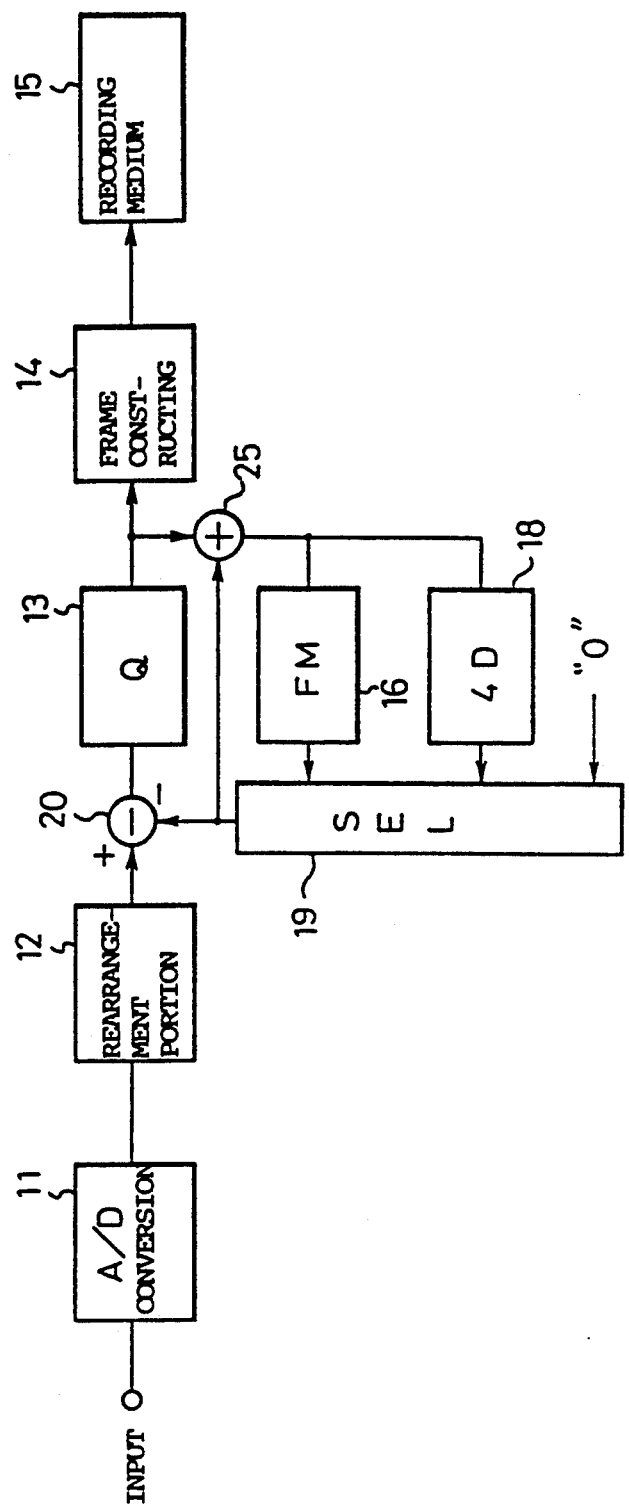
FIG. 4 is a block diagram of a recording apparatus for a moving image as an embodiment of the present invention.

FIG. 4 is a block diagram of a recording apparatus for a moving image as an embodiment of the present invention. In FIG. 4, reference numeral 11 denotes an analog to digital converter, 12 denotes a rearrangement circuit, 13 denotes a quantizer, 14 denotes a frame constructing circuit, 15 denotes a recording medium, 16 denotes a frame memory, 18 denotes a four-pixel delay circuit, 19 denotes a selector, 20 denotes a subtracter, and 25 denotes an adder.

The analog television signal is converted to a digital signal in the analog to digital converter 11, and rearrangement of the (pixel) data is carried out in the rearrangement circuit 12. The rearrangement circuit 12 comprises a line buffer circuit. For example, when a frame is divided into the blocks as shown in FIG. 2, data in the first and second lines is once input, and then, the pixels are output in the order $P_1$, $P_2$, $P_3$, and $P_4$ in the block $G_{11}$, $P_1$, $P_2$, $P_3$, and $P_4$ in the block $G_{12}$, and so on.

The output of the rearrangement circuit 12 is input into the subtracter 20 as a minuend, and the output of the selector 19 is subtracted from the above input. The output of the subtracter 20 is quantized in the quantizer 13, and the output of the quantizer 13 is applied to the frame constructing circuit 14 and the adder 25. The adder 25 adds the output of the quantizer 13 to the output of the frame memory 16 or the four-pixel delay circuit 18 to regenerate data of each pixel in a frame. The regenerated data is input into an address of a corresponding pixel in the frame memory 16, and the four-pixel delay circuit 18. The frame memory 16 memorizes real data of all pixels of a frame which is last regenerated based on the output of the quantizer 13. The four-pixel delay circuit 18 delays the output of the adder 25 by a certain time corresponding to four pixels, to supply data of a pixel in a preceding block corresponding to a pixel which is subject to difference calculation by the intraframe coding, to the subtracter 20 as a subtrahend, where the corresponding pixel serves as a reference for carrying out the difference calculation. The selector 19 selects one of the output of the frame memory 16, the output of the four-pixel delay circuit 18, and the output of a fixed "0" input, to supply the selected signal to the subtracter 20 as a subtrahend. The selector 19 selects the output of the frame memory 16 when data of a pixel which is subject to difference calculation by the intraframe coding, is input into the subtracter 20, where the output of the frame memory 16 corresponds to the above pixel subject to difference calculation. The selector 19 selects the "0" input when data of a pixel which is not subject to difference calculation (for example, the pixel $P_i$ in the above-mentioned block $G_{11}$) is input into the subtracter 20. The selector 19 selects the output of the four-pixel delay circuit 18 when data of a pixel which is subject to difference calculation by the interframe coding, is input into the subtracter 20. The above selection in the selector 19 is cyclically carried out under control of a timing signal (control signal) which is generated in a timing generation circuit 24 as shown in FIG. 5. In particular, the phase of the timing signal from the timing generation circuit 24 is cyclically shifted to control whether data of the four pixels in each block are respectively to be coded by intraframe coding or interframe coding. Namely, data of the pixel $P_1$ is selected when coding data in the $(4n+1)$-th frame, data of the pixel $P_2$ is selected when coding data in the $(4n+2)$-th frame, data of the pixel $P_3$ is selected when coding data in the $(4n+3)$-th frame, and data of the pixel $P_4$ is selected when coding data in the $(4n)$-th frame, where n is an integer.

A case is considered wherein data of the pixel $P_1$ in each of the blocks $G_{11}$, $G_{12}$, . . . is coded by intraframe coding, and data of the pixels $P_2$, $P_3$, and $P_4$ in each of the blocks $G_{11}$, $G_{12}$, . . . is coded by interframe coding. The selector 19 selects the "0" input for the data of the pixel $P_1$ in the block $G_{11}$ since data of the pixel $P_1$ in the block $G_{11}$ is to be coded as is, a calculation of (the data of the pixel $P_1$ in the block $G_{11}$)—"0", is carried out in the subtracter 20, and the output of the subtracter 20 is input into the quantizer 13. For the pixels $P_2$, $P_3$, and $P_4$ in the block $G_{11}$, the selector 19 selects the data of a pixel in a preceding frame corresponding to the pixel subject to the coding, from the frame memory 16 which stores data in the preceding frame, since data of the pixels $P_2$, $P_3$, and $P_4$ in the block $G_{11}$ is to be coded by the interframe coding. Then the subtracter 20 obtains a difference between the data subject to the coding and the data of the pixel in the preceding frame corresponding to the pixel subject to the coding, to supply the result to the quantizer 13.

For the pixel $P_1$ in the block $G_{12}$, where a difference between the data of the pixel $P_1$ in the block $G_{12}$ and the data of the pixel $P_1$ in the block $G_{11}$ must be obtained, the selector 19 selects the data of a pixel in the preceding block corresponding to the pixel subject to the coding, from the four-pixel delay circuit 18, and then the subtracter 20 obtains a difference between the data subject to the coding and the data of the pixel in the preceding block corresponding to the pixel subject to the coding (for example, the pixel $P_1$ in the block $G_{11}$ to obtain a difference for the pixel $P_1$ in the block $G_{12}$), to supply the result to the quantizer 13. Similar operations are carried out for the pixels in the following frames.

The frame constructing circuit 14 inputs the output of the quantizer 13, and generates a frame in the form shown in FIG. 3. The frame is written on a recording medium 15 such as an optomagnetic disc device through a well-known mechanism for writing data on a recording medium (not shown, but, for example, such a mechanism is known as incorporated in an optical disc device).

FIG. 5 shows a detail of the construction of FIG. 4. In FIG. 5, reference numeral 12' denotes a scanning line conversion circuit, 21 denotes an interframe coded data memory, 22 denotes an intraframe coded data memory, 23, 23', 23" each denote a frame synchronization pattern adding circuit, 24 denotes a timing generation circuit, 25 denotes an adder, and $SW_1$, $SW_2$ each denote a switch. In FIG. 5, the same reference numerals as FIG. 4 denote the same elements as FIG. 4. The scanning line conversion circuit 12' in FIG. 5 corresponds to the rearrangement circuit 12 in FIG. 4. The analog to digital converter converts an analog signal of moving image data (television signal) into a digital signal, and detects a frame by a synchronizing signal to supply the detected timing of the frame to the timing generation circuit 24. The timing generation circuit 24 receives the above timing of the frame, generates a timing (clock) signal which synchronizes with timing of an input of each pixel data, generates the timing signal (control signal) for controlling switching of the selector 19 by dividing a frequency of the above clock signal, generates a timing signal for giving timing to the frame constructing input 14 for generating a frame, and generates a switching signal (interframe/intraframe switch signal) for controlling the switches $SW_1$ and $SW_2$. Since the above timing signals generated in the timing generation circuit 24 are periodic, these signals can be generated by dividing a frequency of the above clock signal where the period of the clock signal corresponds to a cycle of an input of data of a pixel. The adder 25 adds the output of the quantizer 13 and the output of the selector 19 to supply the result to the frame memory 16 and the four-pixel delay circuit 18. As shown in FIG. 5, the frame constructing circuit 14 shown in FIG. 4 comprises the interframe coded data memory 21, the intraframe coded data memory 22, the switches $SW_1$ and $SW_2$, and the frame synchronization pattern adding circuit 23.

Receiving the above interframe/intraframe switch signal, the switches $SW_1$ and $SW_2$ are switched so that the quantized output for the data of the pixel which is subject to the interframe difference calculation is stored in the memory 21, and the quantized output for the data of the pixel which is subject to the intraframe difference calculation is stored in the memory 22. The frame synchronization pattern adding circuit 23 alternatively reads the output of the interframe coded data memory 21 and the output of the intraframe coded data memory 22, synchronized with the timing signal from the timing generation circuit 24, and adds a frame signal thereto to form a data format as shown in FIG. 3, and writes the formatted data onto the recording medium 15 by the well-known writing mechanism (not shown).

FIG. 6 shows a construction of a data regenerating apparatus for decoding moving image data which is band compressed and recorded on the recording medium 15 in the data format of FIG. 3, to regenerate an image. In FIG. 6, reference numeral 31 denotes a frame detection circuit, 32 denotes an interframe coding data memory, 33 denotes an intraframe coding data memory, $SW_3$, $SW_4$ denotes a switch, 34 denotes an adder, 35 denotes a frame memory, 36 denotes a four-bit delay circuit, 37 denotes a selector, 38 denotes a scanning line reverse conversion circuit, 39 denotes a digital to analog converter, and 40 denotes a timing control circuit.

The frame detection circuit 31 detects frame timing from data in the data format of FIG. 3, which is read from the recording medium 15 by a reading mechanism (which optical disc devices comprise, although not shown). The timing generation circuit 40 generates a clock signal in which one cycle corresponds to a pixel, and generates a timing signal (interframe/intraframe switch signal) to control switching of the switches $SW_3$ and $SW_4$ by appropriately dividing the frequency of the clock signal, and generates a timing signal (control signal) to control the selector 37. Since the timing signals which are generated in the timing generation circuit 40 are periodic, they can be readily generated by appropriately dividing the frequency of the clock signal. Under the control of the switch $SW_3$ by the interframe/intraframe switch signal, the data $D_b$ of FIG. 3 which is coded by the interframe difference coding, is written in the interframe coding data memory 32, and the interframe/intraframe switch signal, the data $D_j$ of FIG. 3 which is coded by the intraframe difference coding, is written in the intraframe coding data memory 33. The data $D_b$ which is coded by the interframe difference coding and is read from the recording medium 15, and the data $D_j$ which is coded by the intraframe difference coding and is read from the recording medium 15 are temporarily held in the interframe coding data memory 32 and the intraframe coding data memory 33, respectively. Since the switch $SW_4$ is also switched by the interframe/intraframe switch signal, the data $D_b$ which is coded by the interframe difference coding and is read from the recording medium 15, and the data $D_j$ which is coded by the intraframe difference coding are output from the interframe coding data memory 32 and the intraframe coding data memory 33, respectively, and are input into the adder 34. The selector 37 selects one of the output of the frame memory 35, the output of the four-pixel delay circuit 36, and a fixed "0" input, to supply the selected signal to the adder 34 as an addend. When the data of a pixel which is coded by the interframe difference coding, is read from the interframe coding data memory 32, and is input into the adder 34, the selector 37 selects the output of the frame memory 35. When the data of a pixel which is coded by the intraframe difference coding, but is equal to real data (for example, the above-mentioned pixel $P_1$ in the block $G_{11}$), is read from the intraframe coding data memory 33, and is input into the adder 34, the selector 37 selects the above "0" input. When the difference data of a pixel which is coded by the intraframe difference coding, is read from the intraframe coding data memory 33, and is input into the adder 34, the selector 37 selects the output of the four-pixel delay circuit 36. The frame memory 35 holds (decoded) data of each pixel in a preceding frame. The four-pixel delay circuit 36 delays the output of the adder 34 by four pixels so that the four-pixel delay circuit 36 outputs data which precedes data to be decoded, by four pixels, where the preceding data is used as a reference for decoding data of a pixel which is coded by the intraframe coding. The selection in the selector 37 is periodically switched according to a state of the timing signal (control signal) from the timing generation circuit 40. In particular, the phase of the timing signal from the timing generation circuit 24 is cyclically shifted to control whether data of the four pixels in each block is respectively to be intraframe coded or interframe coded. Namely, data of the pixel $P_1$ is selected when decoding data in the $(4n+1)$-th frame, data of the pixel $P_2$ is selected when decoding data in the $(4n+2)$-th frame, data of the pixel $P_3$ is selected when decoding data in the $(4n+3)$-th frame, and data of the pixel $P_4$ is selected when decoding data in the $(4n)$-th frame, where n is an integer.

Thus, when the above interframe/intraframe switch signal makes the switches $SW_3$ and $SW_4$ select the interframe coding data memory 32, data which is coded by the interframe coding and is output from the interframe coding data memory 32, is added to data of a pixel in a preceding frame which pixel corresponds to the data which is to be decoded, in the adder 34, and the added result is input into the scanning line reverse conversion circuit 38, the frame memory 35, and the four-pixel delay circuit 36. When the above interframe/intraframe switch signal makes the switch $SW_4$ select the intraframe coding data memory 33, and data of a pixel which is coded by intraframe coding and is equal to real data (for example, the above-mentioned pixel $P_1$ in the block $G_{11}$), is input into the adder 34, the output of the adder 34 is equal to the real data, and the output of the adder 34 is input into the scanning line reverse conversion circuit 38, the frame memory 35, and the four-pixel delay circuit 36. When the above interframe/intraframe switch signal makes the switch $SW_4$ select the intraframe coding data memory 33, and data of a pixel which is coded by intraframe coding and is a difference data (for example, the above-mentioned pixel $P_1$ in the block $G_{12}$), is input into the adder 34, the output of the adder 34 is equal to a sum of the difference data and data of a pixel (for example, the above-mentioned pixel $P_1$ in the block $G_{11}$) in a preceding block which pixel corresponds to the difference data, and the sum is input into the scanning line reverse conversion circuit 38, the frame memory 35, and the four-pixel delay circuit 36.

The scanning line reverse conversion circuit 38 carries out conversion which is the reverse of the conversion in the scanning line conversion circuit 12' in the construction of FIG. 5, comprises a line buffer containing two lines. A decoded data, which is supplied from the adder 34 in the form of a block comprised of $2 \times 2$ pixels, is written in the line buffer one block by one block. When all the pixels of two lines are written in the line buffer, the written data is supplied to the digital to analog converter 39 to be converted to an analog moving image data signal.

Figure 10:
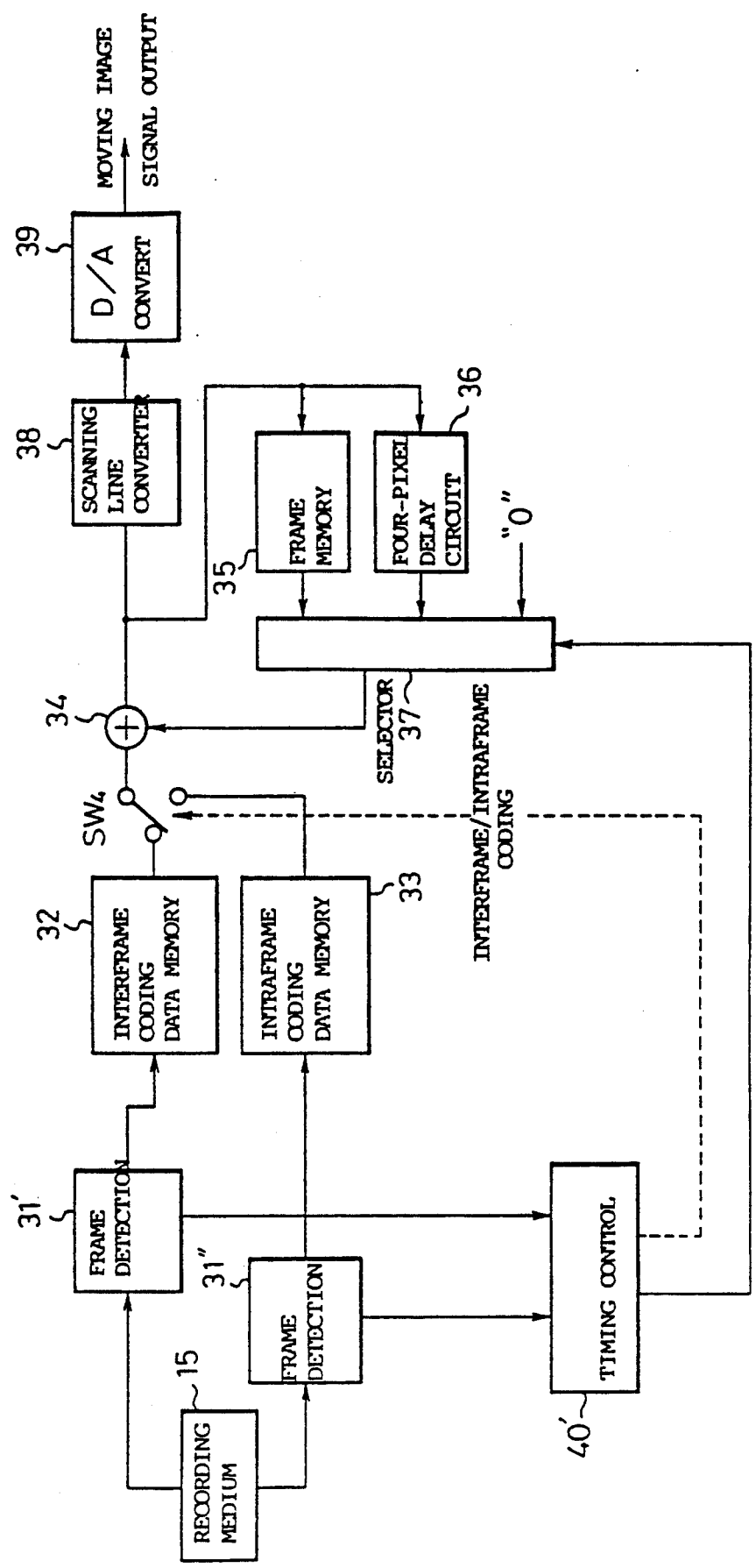
FIG. 10 shows another construction of a data regenerating apparatus for decoding moving image data which is band compressed and recorded, and regenerating an image.

On a disc device, independent data can be written simultaneously on each of two sides of an optical disc, and the data can be read from the two sides, simultaneously. In the above disc device, the aforementioned data which is coded by the intraframe coding and the aforementioned data coded by the interframe coding can be simultaneously written one and the other sides of the optical disc, respectively, and the data can be read from both sides of the optical disc. In this case, data formats as shown in FIGS. 7 and 8, can be used, and the constructions of FIG. 5 and 6 can be changed to the constructions as shown in FIG. 9 and 10 for recording and regenerating the above data, respectively.

The difference of the construction of FIG. 9 from the construction of FIG. 5 is that the output of the interframe coded data memory 21 and the output of the intraframe coded data memory 22 are respectively input into the frame constructing circuits 23' and 23" which are provided independently from each other, therein the frames as shown in FIGS. 7 and 8 are respectively formed, and then the data are simultaneously written in one and the other sides of the optical disc, respectively. The difference of the construction of FIG. 10 from the construction of FIG. 6 is that interframe coded data and intraframe coded data as shown in FIGS. 7 and 8 are respectively read from both sides of the optical disc in parallel, frame timing is detected in each of the interframe coded data and the intraframe coded data in the frame detection circuits 31' and 31", and then, the interframe coded data and the intraframe coded data are respectively in the interframe coded data memory 21 and the intraframe coded data memory 22. The timing control circuit 40' generates timing signals for controlling the switch $SW_4$ and the selector 37 so that the data is read from the interframe coded data memory 21 and the intraframe coded data memory 22, and an image is regenerated.

As explained above, according to the present invention, since a part of data in each block is difference data coded by intraframe coding, it is possible to regenerate an image when starting to read the recorded data from a frame following the first frame, to randomly access coded and stored data, and to scan the data fast. In addition, since all the data other than the above data coded by intraframe coding, is coded by interframe coding the compression efficiency of which is high, a large amount of data can be recorded.

We claim:

1. A moving image coding apparatus for band compressing frames of moving image data, comprising:
   intraframe coding means for band compressing the moving image data by intraframe coding;
   interframe coding means for band compressing the moving image data by interframe coding;
   block division means for dividing data in each frame into a plurality of blocks each of which includes a predetermined number of pixels; and
   coding switch means for controlling said intraframe coding means and said interframe coding means so that coding is executed by said intraframe coding means for the moving image data of a predetermined portion of the pixels in each of the blocks, and coding is executed by said interframe coding means for the moving image data of a remaining portion of the pixels in each of the blocks,
   wherein each of the blocks has an equal width in both vertical and horizontal directions, and a location of the predetermined portion of the pixels in each of the blocks, is the same for all pixels in a frame, and
   wherein said moving image coding apparatus further comprises:
   frame detecting means for detecting a synchronizing signal which is included in an input moving image signal,
   clock generating means for generating a clock signal which indicates timing of an input of data of each pixel, synchronized with the synchronizing signal, and
   timing generating means for generating a timing signal for controlling the switching in said coding switch means by dividing a frequency of the clock signal by a frequency dividing ratio which is determined based on the width of the blocks and the location of the predetermined portion of the pixels.

2. A moving image coding apparatus for band compressing frames of moving image data, comprising:
   intraframe coding means for band compressing the moving image data by intraframe coding;
   interframe coding means for band compressing the moving image data by interframe coding;
   block division means for dividing data in each frame into a plurality of blocks each of which includes a predetermined number of pixels; and
   coding switch means for controlling said intraframe coding means and said interframe coding means so that coding is executed by said intraframe coding means for the moving image data of a predetermined portion of the pixels in each of the blocks, and coding is executed by said interframe coding means for the moving image data of a remaining portion of the pixels in each of the blocks,
   wherein said interframe coding means comprises:
   frame memory means for storing data of each of the pixels in a preceding frame, and
   first subtractor means for obtaining a difference between data of a first pixel to be coded and data of a second pixel of the pixels in a preceding frame which is stored in said frame memory means and corresponds to the first pixel to be coded;
   wherein said intraframe coding means comprises:
   reference pixel data memory means for holding data of a third pixel used as a reference in said intraframe coding, and
   second subtracter means for obtaining a difference between data of a fourth pixel to be coded, and the data of the third pixel used as the reference and stored in said reference pixel data memory means, where said first subtracter means in said interframe coding means and said second subtracter means in said intraframe coding means are provided by common subtracter means;

wherein said coding switch means includes means for supplying as a subtrahend the data of the second pixel in the preceding frame which is stored in said frame memory and corresponds to the first pixel to be coded, when the data of the first pixel to be coded by said interframe coding means is input into said common subtracter means, and for supplying as a subtrahend the data of the third pixel used as the reference and stored in said reference pixel data memory means when data of the fourth pixel to be coed by said intraframe coding means is input into said common subtracter means; and wherein each of the blocks has an equal width in both vertical and horizontal directions, and a location of the predetermined portion of the pixels in each of the blocks, is the same for all pixels in a frame, said reference pixel data memory means includes means for storing and outputting the data of the second one of the pixels which precedes the first pixel to be coded, by a number which is equal to the predetermined number of the pixels in each of the blocks.

3. A moving image coding apparatus for band compressing frames of moving image data, comprising:
intraframe coding means for band compressing the moving image data by intraframe coding;
interframe coding means for band compressing the moving image data by interframe coding;
block division means for dividing data in each frame into a plurality of blocks each of which includes a predetermined number of pixels; and
coding switch means for controlling said intraframe coding means and said interframe coding means so that coding is executed by said intraframe coding means for the moving image data of a predetermined portion of the pixels in each of the blocks, and coding is executed by said interframe coding means for the moving image data of a remaining portion of the pixels in each of the blocks,
wherein each of the blocks has an equal width in both vertical and horizontal directions, and a location of the predetermined portion of the pixels in each of the blocks, is the same for all pixels in a frame, and
wherein said coding switch means includes means for changing locations of the predetermined portion of the pixels in each of the blocks for respective frames.

4. A moving image coding apparatus for band compressing frames of moving image data, comprising:
intraframe coding means for band compressing the moving image data by intraframe coding;
interframe coding means for band compressing the moving image data by interframe coding;
block division means for dividing data in each frame into a plurality of blocks each of which includes a predetermined number of pixels; and
coding switch means for controlling said intraframe coding means and said interframe coding means so that coding is executed by said intraframe coding means for the moving image data of a predetermined portion of the pixels in each of the blocks, and coding is executed by said interframe coding means for the moving image data of a remaining portion of the pixels in each of the blocks,
wherein each of the blocks has an equal width in both vertical and horizontal directions, and a location of the predetermined portion of the pixels in each of the blocks, is the same for all pixels in a frame, and
said coding switch means includes means for cyclically shifting locations of the predetermined portion of the pixels in each of the blocks for respective frames.

5. A moving image coding apparatus according to claim 4, further comprising:
frame detecting means for detecting a synchronizing signal included in an input moving image signal,
clock generating means for generating a clock signal having a frequency indicating timing of data input of each pixel, synchronized with the synchronizing signal, and
timing generating means for generating a timing signal for controlling switching in said coding switch means by dividing the frequency of the clock signal by a frequency dividing ratio which is determined based on the equal width of the blocks and the location of the predetermined portion of the pixels, said timing generating means including means for shifting phases of the timing signal for controlling said coding switch means to produce cyclical shifts for respective frames.

6. A moving image coding apparatus for recording and band compressing frames of moving image data, comprising:
intraframe coding means for band compressing the moving image data by intraframe coding;
interframe coding means for band compressing the moving image data by interframe coding;
block division means for dividing data in each frame into a plurality of blocks each of which includes a predetermined number of pixels;
coding switch means for controlling said intraframe coding means and said interframe coding means so that coding is executed by said intraframe coding means for the moving image data of a predetermined portion of the pixels in each of the blocks, and coding is carried out by said interframe coding means for the moving image data of a remaining portion of the pixels in each of the blocks; and
recording means for recording the coded moving image data on a recording medium,
wherein said recording means comprises frame constructing means for constructing a predetermined frame containing the coded moving image data.

7. A moving image coding apparatus according to claim 6, wherein said recording means comprises:
first buffer memory means for temporarily holding the moving image data coded by said interframe coding means, to become the coded moving image data,
second buffer memory means for temporarily holding the moving image data coded by said intraframe coding means, to become the coded moving image data, and
supply data switch means for alternatively supplying the moving image data coded by said interframe coding means and the data coded by said intraframe coding means to said frame constructing means.

8. A moving image coding apparatus for recording and band compressing frames of moving image data, comprising:
- intraframe coding means for band compressing the moving image data by intraframe coding;
- interframe coding means for band compressing the moving image data by interframe coding;
- block division means for dividing data in each frame into a plurality of blocks each of which includes a predetermined number of pixels;
- coding switch means for controlling said intraframe coding means and said interframe coding means so that coding is executed by said intraframe coding means for the moving image data of a predetermined portion of the pixels in each of the blocks, and coding is carried out by said interframe coding means for the moving image data of a remaining portion of the pixels in each of the blocks; and
- recording means for recording the coded moving image data on a recording medium, wherein said recording means comprises:
- first buffer memory means for temporarily holding the moving image data which is coded by said interframe coding means, to become the coded moving image data,
- second buffer memory means for temporarily holding the moving image data which is coded by said intraframe coding means, to become the coded moving image data,
- first frame constructing means for constructing a first frame containing the data which is coded by said interframe coding means, and
- second frame constructing means for constructing a second frame containing the coded moving image data which is coded by said intraframe coding means,
- means for writing the first frame of said first frame constructing means on one side of said recording medium and for writing the second frame of said second frame constructing means on the other side of said recording medium.

9. A moving image decoding apparatus for decoding frames of moving image data which is band compressed, comprising:
- interframe decoding means for decoding the moving image data which is band compressed by interframe coding;
- intraframe decoding means for decoding the moving image data which is band compressed by intraframe coding; and
- decoding switch means for controlling said intraframe decoding means and said interframe decoding means so that decoding is executed by said intraframe decoding means when the moving image data which is band compressed by intraframe coding is input, and decoding is executed by said interframe decoding means when the moving image data which is band compressed by interframe coding is input, wherein each of the blocks has an equal width in both vertical and horizontal directions, and a location of the predetermined portion of the pixels in each of the blocks, is the same for all pixels in a frame, said moving image decoding apparatus comprises:
- frame detecting means for detecting a frame synchronizing signal which is included in an input coded moving image signal,
- clock generating means for generating a clock signal which indicates timing of an input of data of each pixel, synchronized with the frame synchronizing signal, and
- timing generating means for generating a timing signal for controlling the switching in said decoding switch means by dividing a frequency of the clock signal by a frequency dividing ratio which is determined based on the width of the blocks and a location of the predetermined portion of the pixels.

10. A moving image coding apparatus according to claim 9, wherein each of the blocks has an equal width in both vertical and horizontal directions, and a location of the predetermined portion of the pixels in each of the blocks, is the same for all pixels in a frame, and
- said decoding switch means includes means for cyclically shifting locations of the predetermined portion of the pixels in each of the blocks for respective frames.

11. A moving image coding apparatus according to claim 10, wherein said timing generating means includes means for cyclically shifting phases of the timing signal for controlling said decoding switch means for respective frames.

12. A moving image decoding apparatus for decoding frames of moving image data which is band compressed, comprising:
- interframe decoding means for decoding the moving image data which is band compressed by interframe coding;
- intraframe decoding means for decoding the moving image data which is band compressed by intraframe coding; and
- decoding switch means for controlling said intraframe decoding means and said interframe decoding means so that decoding is executed by said intraframe decoding means when the moving image data which is band compressed by intraframe coding is input, and decoding is executed by said interframe decoding means when the moving image data which is band compressed by interframe coding is input, wherein said interframe decoding means comprises:
- frame memory means for storing decoded data of each of the pixels in a preceding frame, and
- adder means for adding data of a first pixel to be decoded and data of a second pixel of the pixels in a preceding frame which is stored in said frame memory means and corresponds to the first pixel to be decoded, wherein said intraframe decoding means comprises:
- reference pixel data memory means for holding data of a third pixel used as a reference when decoding data which is coded by the intraframe coding, and
- adder means for adding data of a fourth pixel to be decoded, and the data of the third pixel used as the reference and stored in said reference pixel data memory means, where said adder means in said interframe decoding means and said adder means in said intraframe decoding means are provided by a common adder means, and wherein said decoding switch means includes means for supplying as an addend the data of the second pixel in the preceding frame which is stored in said frame memory means when data of the first pixel to be coded by said interframe coding is input into said common adder means and for supplying as an addend the data of the third pixel which is used as the reference and is stored in said reference pixel data memory means when data of the fourth pixel coded by said intraframe coding is input into said common adder means, wherein each of the blocks has an equal width in both vertical and horizontal directions, and a location of the predetermined portion of the pixels in each of the blocks, is the same for all pixels in a frame, said reference pixel data memory means includes means for storing and outputting the data of the second pixel which precedes the pixel to be decoded, by a number which is equal to the predetermined number of the pixels in each of the blocks.

13. A moving image decoding apparatus for decoding frames of moving image data which is band compressed, comprising:

interframe decoding means for decoding the moving image data which is band compressed by interframe coding;

intraframe decoding means for decoding the moving image data which is band compressed by intraframe coding; and decoding switch means for controlling said intraframe decoding means and said interframe decoding means so that decoding is executed by said intraframe decoding means when the moving image data which is band compressed by intraframe coding is input, and decoding is executed by said interframe decoding means when the moving image data which is band compressed by interframe coding is input, wherein each of the blocks has an equal width in both vertical and horizontal directions, and a location of the predetermined portion of the pixels in each of the blocks, is the same for all pixels in a frame, and said decoding switch means includes means for changing location of the predetermined portion of the pixels in each of the blocks for respective frames.

14. A moving image regenerating apparatus for decoding frames of moving image data, including first moving image data coded by interframe decoding and second moving image data coded by intraframe decoding, comprising:

coded data input means for inputting the first and second moving image data;

interframe decoding means for decoding the first moving image data input by said coded data input means;

intraframe decoding means for decoding the second moving image data input by said coded data input means; and decoding switch means for controlling said intraframe decoding means and said interframe decoding means so that decoding is executed by said intraframe decoding means when the first moving image data is input, and decoding is carried out by said interframe decoding means when the second moving image data is input, said moving image regenerating apparatus further comprising:

first buffer memory means for temporarily holding the first moving image data input by said coded data input means, second buffer memory means for temporarily holding the second moving image data input by said coded data input means; and wherein said interframe decoding means comprises:

frame memory means for storing the first moving image data in a frame previously decoded by said interframe decoding means, and first adder means for obtaining a first sum of data of a first pixel held in said first buffer memory means and data of a second pixel in the frame stored in said frame memory and corresponding to the first pixel, and wherein said intraframe decoding means comprises:

reference pixel data memory means for holding data of a third pixel used as a reference for decoding data of each pixel held in said second buffer memory means by said intraframe decoding means, and second adder means for obtaining a sum of data of a fourth pixel held in said second buffer memory means and the data of the third pixel stored in said reference pixel data memory means for decoding data of the fourth pixel held in said second buffer memory means, wherein said first adder means and said second adder means are provided by common adder means, and wherein said moving image regenerating apparatus further comprises supply data switch means for alternatively supplying the first moving image data which is output from said first buffer memory means, and the second moving image data which is output from second buffer memory means, to said common adder means.

15. A moving image regenerating apparatus for decoding frames of moving image data, including first moving image data coded by interframe decoding and second moving image data coded by intraframe decoding, comprising:

coded data input means for inputting the first and second moving image data;

interframe decoding means for decoding the first moving image data input by said coded data input means;

intraframe decoding means for decoding the second moving image data input by said coded data input means; and decoding switch means for controlling said intraframe decoding means and said interframe decoding means so that decoding is executed by said intraframe decoding means when the first moving image data is input, and decoding is carried out by said interframe decoding means when the second moving image data is input, wherein said coded data reading means includes means for reading the moving image data coded by the interframe coding and the moving image data coded by the intraframe coding, in parallel; and said moving image regenerating apparatus further comprises:

first buffer memory means for temporarily holding the moving image data which is coded by the interframe coding, second buffer memory means for temporarily holding the moving image data which is coded by the intraframe coding, and supply data switch means for alternatively supplying the moving image data which is output from said first buffer memory means, and the moving image data which is output from said second buffer memory means to said adder means.

16. A moving image coding apparatus for band compressing frames of moving image data, comprising:
intraframe coding means for band compressing the moving image data by intraframe coding;
interframe coding means for band compressing the moving image data by interframe coding;
block division means for dividing data in each frame into a plurality of blocks each of which includes a predetermined number of pixels; and
coding switch means for controlling said intraframe coding means and said interframe coding means so that coding is executed by said intraframe coding means for the moving image data of a predetermined portion of the pixels in each of the blocks, and coding is executed by said interframe coding means for the moving image data of a remaining portion of the pixels in each of the blocks,
wherein said block division means comprises scanning line conversion means for storing a plurality of lines of data, where the number of the lines is equal to a width of each of the blocks in a vertical direction, for inputting the moving image data of the pixels of the lines, and for outputting data of the pixels for each of the blocks, and
wherein said scanning lined conversion means comprises a line buffer.

* * * * *

UNITED STATES PATENT AND TRADEMARK OFFICE
CERTIFICATE OF CORRECTION

PATENT NO. : 5,327,173
DATED : July 5, 1994
INVENTOR(S) : Yoshitsuga NISHIZAWA et al.

It is certified that error appears in the above-indentified patent and that said Letters Patent is hereby corrected as shown below:

Column 1, line 6, delete "[1.]";

line 43, delete "[2.]".

Column 11, line 17, delete "[coed] insert

--coded--.

Signed and Sealed this

Thirteenth Day of December, 1994

Attest:

BRUCE LEHMAN

*Attesting Officer*  *Commissioner of Patents and Trademarks*